United States Patent
Onaka et al.

(10) Patent No.: US 7,522,839 B2
(45) Date of Patent: Apr. 21, 2009

(54) METHOD OF UPGRADING OPTICAL NODE, AND AN OPTICAL NODE APPARATUS

(75) Inventors: Miki Onaka, Kawasaki (JP); Yasushi Sugaya, Kawasaki (JP); Takahumi Terahara, Kawasaki (JP); Satoru Okano, Kawasaki (JP); Takehiro Fujita, Kawasaki (JP); Hiroaki Tomofuji, Kawasaki (JP); Ichiro Nakajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 672 days.

(21) Appl. No.: 11/319,376

(22) Filed: Dec. 29, 2005

(65) Prior Publication Data

US 2008/0002978 A1  Jan. 3, 2008

(30) Foreign Application Priority Data

Aug. 31, 2005 (JP) .............................. 2005-252507

(51) Int. Cl.
*H04B 10/08* (2006.01)
*H04J 14/02* (2006.01)

(52) U.S. Cl. .............................. 398/83; 398/38; 398/93; 398/94

(58) Field of Classification Search .................. 398/38, 398/83, 93, 94, 158, 160, 195, 197
See application file for complete search history.

(56) References Cited

U.S. PATENT DOCUMENTS 6,101,012 A * 8/2000 Danagher et al. ............. 398/1
6,597,830 B1 * 7/2003 Nakabayashi et al. ......... 385/24
6,907,159 B1 * 6/2005 Daniel .......................... 385/24
6,937,820 B2 8/2005 Iwaki et al.
2004/0190820 A1 9/2004 Uda

FOREIGN PATENT DOCUMENTS

JP   2002-77056    3/2002
JP   2004-297235   10/2004

\* cited by examiner

*Primary Examiner*—Dalzid Singh
(74) *Attorney, Agent, or Firm*—Staas & Halsey LLP

(57) ABSTRACT

An optical node apparatus according to the present invention amplifies a WDM signal light input to an input port, and thereafter, branches the amplified WDM signal light by an optical branching coupler to send the branched lights to first and second optical paths, and selects the light propagated through the first optical path by an optical switch to amplify the selected light by a post-amplifier, thereby outputting the amplified light from an output port, when the optical node apparatus is operated as an optical amplification repeating node. When the operational state is upgraded to an optical add/drop multiplexing node, an OADM section is connected between a set of connecting ports on the second optical path, and the adjustment of the OADM section is performed utilizing the WDM signal light branched by the optical branching coupler, and thereafter, the switching of the optical switch is performed to select the light on the second optical path side. As a result, since the switching the operational state from the optical amplification repeating node to the OADM node can be performed in a short time, it becomes possible to provide the continued communication service at the low initial installation cost.

11 Claims, 7 Drawing Sheets

METHOD OF UPGRADING OPTICAL NODE, AND AN OPTICAL NODE APPARATUS

BACKGROUND OF THE INVENTION

1. Field of the Invention

The present invention relates to a method of upgrading an optical node, and an optical node apparatus, in an optical communication system for transmitting a wavelength division multiplexed (WDM) signal light. In particular, the present invention relates to a method of upgrading an optical amplification repeating node to an optical add/drop multiplexing (OADM) node, and an optical node apparatus.

2. Description of the Related Art

Currently, in the metro-core ring, a system for acquiring signal lights of the number of wavelengths (channels) corresponding to a required communication traffic is applied to an OADM node arranged in each metropolitan area, using a WDM transmission system. In a part of the area where such an OADM node is arranged, there is the case where the communications needs have been zero in the beginning of the system construction, but due to the area development thereafter or the location of data center, the communications needs are rapidly increased.

As a method of upgrading the system for coping with the increase of communications needs as described above, there is, for example, a method of installing an optical node apparatus having an OADM function in such an area from the beginning, to enable the OADM function when the communications needs occur (refer to Japanese Unexamined Patent Publication No. 2004-297235). Further, it is also possible to initially install an inline amplifier as an optical amplification repeating node which does not have the OADM function, and to replace the inline amplifier with the optical node apparatus having the OADM function when the communications needs occur, thereby upgrading an optical node from the optical amplification repeating node to the OADM node.

However, in the conventional upgrading method of installing the optical node apparatus having the OADM function from the beginning as described above, there is a problem in that the initial installation cost becomes expensive. Further, in the upgrading method of replacing the inline amplifier initially installed with the optical node apparatus having the OADM function when the communications needs occur, since the communication service in the entire system needs to be suspended for a fixed time when performing the replacement of the optical node apparatus, there is a problem in that the continued communication service cannot be provided.

Moreover, regardless of whether or not the optical node apparatus having the OADM function is installed from the beginning, in the case where an operational state of the optical node apparatus is switched from the optical amplification repeating node to the OADM node according to the communications needs, how quick an operation of the OADM node apparatus after switched can be adjusted to be in an optimum status corresponding to operational channels before switched is a major problem for stably providing the continued communication service.

SUMMARY OF THE INVENTION

The present invention has been accomplished in view of the above problems and has an object to realize an upgrading method capable of switching from an optical amplification repeating node to an OADM node in a short time, and to provide an optical node apparatus whose initial installation cost is low, capable of performing the continued communication service, by applying the upgrading method.

In order to achieve the above objects, an optical node apparatus applied with a method of upgrading an optical node according to the present invention, which is arranged on an optical transmission path of an optical communication system for transmitting a wavelength division multiplexed (WDM) signal light, comprises: an input port and an output port connected to the optical transmission path; a first optical amplifying section that amplifies the wavelength division multiplexed signal light input to the input port; an optical branching coupler which branches the wavelength division multiplexed signal light amplified by the first optical amplifying section into two, to send one of the branched lights to a first optical path while sending the other branched light to a second optical path; a set of connecting ports disposed on the second optical path; an optical add/drop multiplexing (OADM) section; a first optical switch which selects either the light propagated through the first optical path or the light propagated through the second optical path to output the selected light; a second optical amplifying section that amplifies the wavelength division multiplexed signal light output from the first optical switch to output the amplified wavelength division multiplexed signal light to the optical transmission path from the output port; and a control section. Further, the OADM section which is connected between the connecting ports according to the communications needs, has a function of dropping or adding a signal light of particular channel from or to the wavelength division multiplexed signal light, and also includes an output power adjusting section capable of adjusting the output power of signal light of each channel. The control section controls the first optical switch so that the light propagated through the first optical path is selected, when an operational state of the optical node apparatus is an optical amplification repeating node. When the operational state of the optical node apparatus is switched from the optical amplification repeating node to an optical add/drop multiplexing (OADM) node, the control section calculates an adjusting amount in the output power adjusting section of the OADM section connected between the connecting ports, utilizing the wavelength division multiplexed signal light which is branched by the optical branching coupler to be input via the second optical path, and controls the output power adjusting section so that the calculated adjusting amount reaches a previously determined target adjusting amount, and thereafter, controls the first optical switch so that the light propagated through the second optical path is selected.

In the optical node apparatus having the configuration as described above, in the case where the optical node apparatus is operated as the optical amplification repeating node such as in the beginning of the system construction, the WDM signal light input to the input port from the optical transmission path passes through the first optical amplifying section, the optical branching coupler, the first optical path, the first optical switch and the second optical amplifying section, sequentially, to be output to the optical transmission path from the output port. Then, in the case where the communications needs occur to the optical node apparatus and the operational state of the optical node apparatus is upgraded from the optical amplification repeating node to the OADM node, firstly, the OADM section is connected between the set of connecting ports disposed on the second optical path. Since the WDM signal light which is branched by the optical branching coupler to be sent to the second optical path, is input to the OADM section, the adjusting amount in the output power adjusting section is calculated by the control section utilizing this WDM signal light, and the output power adjusting section is controlled so that the calculated adjusting amount reaches the previously determined target adjusting amount. Then, after the control of the output power adjusting section is completed, the control section switches the first optical switch to select the second optical path side. As a result, the WDM signal light input to the input port from the optical transmission path passes through the first optical amplifying section, the optical branching coupler, the OADM section on the second optical path, the first optical switch and the second optical amplifying section, sequentially, to be output to the optical transmission path from the output port.

Further, the above described optical node apparatus may be configured such that a second optical switch which outputs the wavelength division multiplexed signal light amplified by the first optical amplifying section to either the first optical path or the second optical path, is disposed in place of the optical branching coupler, and also a third optical amplifying section is disposed on the second optical path between the second optical switch and the connecting ports. In this case, the control section controls the second optical switch so that the wavelength division multiplexed signal light amplified by the first optical amplifying section is output to the first optical path, and also controls the first optical switch so that the light propagated through the first optical path is selected, when the operational state of the optical node apparatus is made to be the optical amplification repeating node. When the operational state of the optical node apparatus is switched from the optical amplification repeating node to the optical add/drop multiplexing node, the control section calculates the adjusting amount in the output power adjusting section of the OADM section connected between the connecting ports, utilizing an amplified spontaneous emission light generated in the third optical amplifying section, and controls the output power adjusting section so that the calculated adjusting amount reaches the previously determined target adjusting amount. Thereafter, the control section controls the second optical switch so that the wavelength division multiplexed signal light amplified by the first optical amplifying section is output to the second optical path and also controls the first optical switch so that the light propagated through the second optical path is selected.

In the optical node apparatus having the configuration as described above, in the case where the optical node apparatus is operated as the optical amplification repeating node, the WDM signal light input to the input port from the optical transmission path passes through the first optical amplifying section, the second optical switch, the first optical path, the first optical switch and the second optical amplifying section, sequentially, to be output to the optical transmission path from the output port. Since the second optical switch is used in place of the optical branching coupler, the WDM signal light is not sent to the second optical path when the optical node apparatus is operated as the optical amplification repeating node. Therefore, it is no longer possible to perform the control of the OADM section which has been performed utilizing the WDM signal light from the optical branching coupler when the operational state of the optical node apparatus is upgraded from the optical node to the OADM node. Accordingly, in the case where the second optical switch is used, the third optical amplifying section is arranged on the second optical path between the second optical switch and the connecting ports, and the control of the OADM section is performed utilizing the amplified spontaneous emission light generated in the third optical amplifying section. Then, after the control of the OADM section is completed, the switching of the first and second optical switches are performed so that the second optical path side is selected. As a result, the WDM signal light input to the input port from the optical transmission path passes through the first optical amplifying section, the second optical switch, the third optical amplifying section and the OADM section on the second optical path, the first optical switch and the second optical amplifying section, sequentially, to be output to the optical transmission path from the output port.

According to the optical node apparatus to which the method of upgrading the optical node according to the present invention is applied, since the set of connecting ports is disposed on the second optical path, and the OADM section is connected between the set of connecting ports according to the communications needs, it is possible to suppress the initial installation cost. Further, when the operational state of the optical node apparatus is upgraded from the optical amplification repeating node to the OADM node, the WDM signal light branched by the optical branching coupler or the amplified spontaneous emission light generated in the third optical amplifying section on the second optical path is utilized to control the adjusting amount in the output power adjusting section of the OADM section, and after the control of the adjusting amount is completed, the switching is performed from the first optical path to the second optical path. Consequently, since the operation of the OADM section after the upgrade can be brought into an optimum condition in a short time, it becomes possible to stably provide the continued communication service.

The other objects, features and advantages of the present invention will be apparent from the following description of the embodiments with reference to the accompanying drawings.

DETAILED DESCRIPTION OF THE INVENTION

Figure 1:
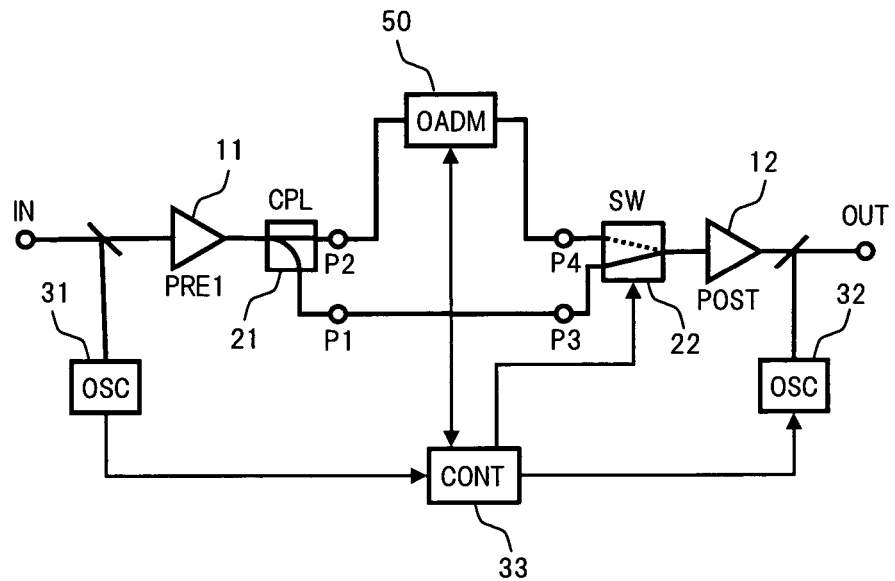
FIG. 1 is a block diagram showing a configuration of a first embodiment of an optical node apparatus according to the present invention.

Hereinafter, embodiments of the present invention will be described with reference to drawings. The same reference numerals denote the same or equivalent parts in all drawings.

FIG. 1 is a block diagram showing a configuration of a first embodiment of an optical node apparatus according to the present invention.

In FIG. 1, the present optical apparatus comprises, for example, a pre-amplifier (PRE1) 11 serving as a first optical amplifying section and a post-amplifier (POST) 12 serving as a second optical amplifying section, which are disposed between an input port IN and an output port OUT, and includes an optical branching coupler (CPL) 21, four connecting ports P1 to P4 and an optical switch (SW) 22, which are disposed between the pre-amplifier 11 and the post-amplifier 12.

The pre-amplifier 11 is input with a WDM signal light which is propagated through an optical transmission path (not shown in the figure) connected to the input port IN, and amplifies the WDM signal light so that the optical power per one channel reaches a previously set level. As the pre-amplifier 11, it is possible to use a known optical amplifier, such as a rare-earth element doped fiber amplifier, a semiconductor optical amplifier, a Raman amplifier or the like, for example.

The optical branching coupler 21 branches the WDM signal light amplified by the pre-amplifier 11 into two at a previously set ratio, and outputs one of the branched lights to the connecting port P1 side while outputting the other branched light to the connecting port P2 side. Note, the branching ratio by the optical branching coupler 21 will be described later.

The optical switch 22 is a typical 2×1 optical switch which selects either the light from the connecting port P3 side or the light from the connecting port P4 to output the selected light to the post-amplifier 12. To the connecting port P3, the connecting port P1 is connected via an optical beam path. On the other hand, an OADM section 50 serving as an optical add/drop multiplexing section is connected between the connecting port P4 and the connecting port P2 according to the communications needs. Incidentally, here an optical propagation route connecting between the connecting ports P1 and P3 is a first optical path, and an optical propagation route connecting between the connecting ports P2 and P4 is a second optical path.

Figure 2:
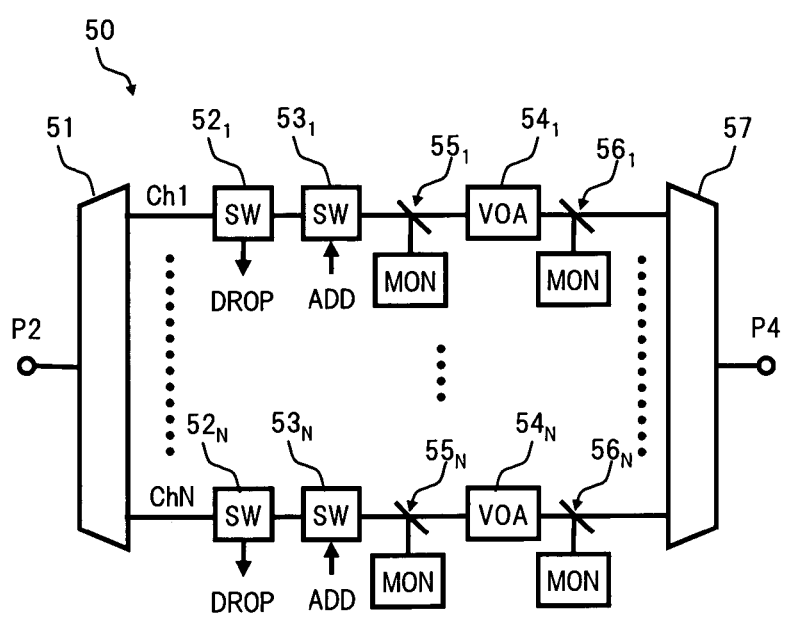
FIG. 2 is a block diagram showing a configuration example of an OADM section applied to the first embodiment.

As shown in FIG. 2 for example, the OADM section 50 comprises: a demultiplexer 51; optical switches (SW) $52_1$ to $52_N$ and $53_1$ to $53_N$; variable optical attenuators (VOA) $54_1$ to $54_N$ each serving as an output power adjusting section; input monitors $55_1$ to $55_N$; output monitors $56_1$ to $56_N$; and a multiplexer 57. The demultiplexer 51 demultiplexes the WDM signal light given from the connecting port P2 into signal lights of respective channels Ch1 to ChN (N is integer of two or more). The optical switches $52_1$ to $52_N$ each performs the switching processing as to whether the dropping of the signal light of each channel demultiplexed by the demultiplexer 51 should be performed in the present optical node. The optical switches $53_1$ to $53_N$ each performs the switching processing as to whether or not the adding of the signal light should be performed in the present optical node. The variable optical attenuators $54_1$ to $54_N$ is for adjusting the powers of the signal lights sent from the optical switches $53_1$ to $53_N$. The input monitors $55_1$ to $55_N$ monitor the powers of the lights input to the variable optical attenuators $54_1$ to $54_N$. The output monitors $56_1$ to $56_N$ monitor the powers of the lights output from the variable optical attenuators $54_1$ to $54_N$. The multiplexer 57 multiplexes the lights of respective channels Ch1 to ChN to send the multiplexed light to the connecting port P4.

Incidentally, the configuration of the OADM section applicable to the optical node apparatus of the present invention is not limited to the above example, and an OADM section of an arbitrary configuration provided with a function of adjusting the output powers of the signal lights of respective channels is available to the present invention.

Further, the optical node apparatus shown in FIG. 1 comprises: an OSC receiving section 31 for receiving an optical supervisory channel (OSC) transmitted between the optical nodes and an OSC transmitting section 32 for transmitting the optical supervisory channel transmitted between the optical nodes; and a control section (CONT) 33 serving as a control section for controlling respective operations of the optical switch 22 and the OADM section 50.

The OSC receiving section 31 extracts the OSC which is transmitted together with the WDM signal light from an upstream optical node, between the input port IN and the pre-amplifier 11, and performs the reception processing of the OSC to acquire information relating to operational channels contained in the WDM signal light. The control section 33 adjusts the OADM section 50 based on the operational channel information acquired in the OSC receiving section 31, and also performs the switching of the optical switch 22. The OSC transmitting section 32 generates the OSC to be transmitted to a downstream optical node, and multiplexes the generated OSC with the WDM signal light output from the post-amplifier 12, to send the multiplexed light to the output port OUT.

Next, there will be described an operation of the first embodiment.

Figure 3:
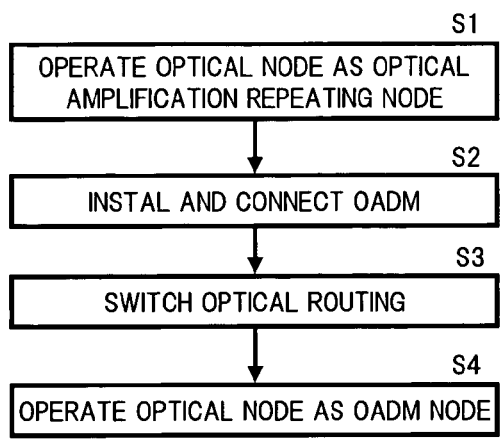
FIG. 3 is a flowchart for explaining a basic operation for when an operational state of the optical node apparatus is upgraded to an OADM node in the first embodiment.

In the optical node apparatus having the configuration as described in the above, in the case where, in the beginning of the system construction, the communications needs occur in an area where the present optical node apparatus is arranged and the optical node apparatus is operated as an OADM node, the OADM section 50 is attached between the connecting ports P2 and P4. On the other hand, in the case where the optical node apparatus is operated as an optical amplification repeating node, in order to suppress the initial installation cost, an optical terminator is attached to each of the connecting ports P2 and P4, in place of the OADM section 50. In the followings, there will be described in detail an operation for when the communications needs occur after the system construction and an operational state of the present apparatus is upgraded from the optical amplification repeating node to the OADM node, referring to flowcharts of FIG. 3 and FIG. 4.

Firstly, in the optical node apparatus in the beginning of the system construction, which has the configuration in which the OADM section 50 is not attached between the connecting ports P2 and P4, the optical switch 22 is controlled by the control section 33, and the initial setting is made so that the light on the connecting port P3 side is output to the post-amplifier 12. As a result, the WDM signal light input to the input port IN is amplified by the pre-amplifier 11 and thereafter, is branched by the optical branching coupler 21 into two. The WDM signal light output to the connecting port P1 side from the optical branching coupler 21 is sent, via the connecting port P3 and the optical switch 22, to the post-amplifier 12 to be again amplified, and the amplified WDM signal light is output from the output port OUT. On the other hand, the WDM signal light output to the connecting port P2 side from the optical branching coupler 21 is terminated by the optical terminator attached to the connecting port P2. As a result, the present optical node apparatus is operated as the optical amplification repeating node (S1 in FIG. 3).

Incidentally, the branching ratio by the optical branching coupler 21 is previously set so that the optical power output to the connecting port P2 side becomes higher than the optical power output to the connecting port P1, considering the operation in the operational time of the present optical node apparatus as the OADM node described later. In the case where the output optical power of P1 side: the output optical power of P2 side=1:n(n>1), a value of n can be set to 100 or so, for example.

Next, when the communications needs occur in the area where the present optical node apparatus is arranged, and the present optical node apparatus is decided to be operated as the OADM node, the OADM section 50 is newly disposed. An input terminal of the demultiplexer 51 in the OADM section 50 is connected to the connecting port P2, and also an output terminal of the multiplexer 57 is connected to the connecting port P4 (S2), so that the switching of optical routes is executed (S3).

Figure 4:
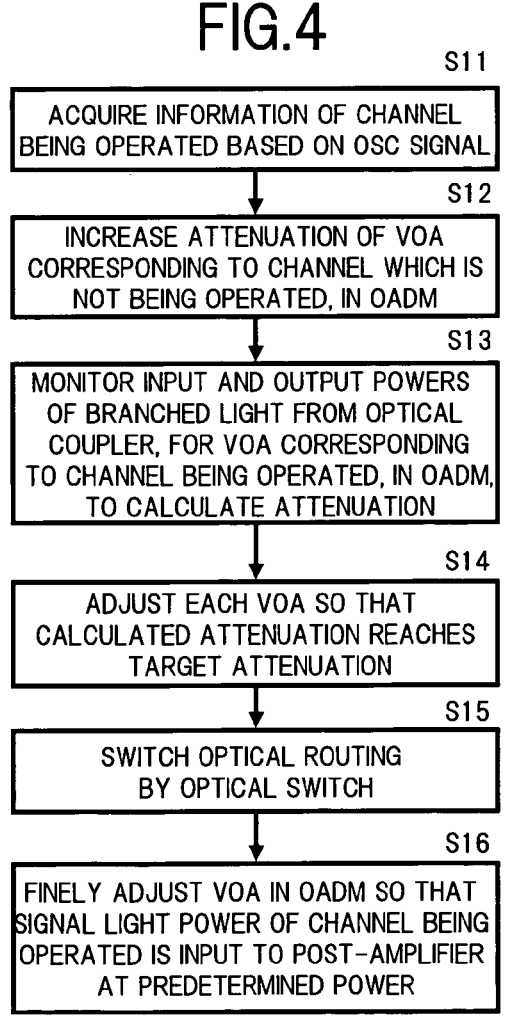
FIG. 4 is a flowchart for explaining specific procedures of the switching of optical routing in FIG. 3.

As shown in FIG. 4 for example, the switching of optical routes is performed such that, the control section 33 acquires the channel information (the number of wavelengths and the wavelength allocation) of the WDM signal light during the operation of the present optical node apparatus as the optical amplification repeating node, based on an output signal from the OSC receiving section 31 (S11).

When the connection of the OADM section 50 and the acquisition of the channel information are completed, the control section 33 adjusts the variable optical attenuator corresponding to the channel which is not being operated, among the variable optical attenuators $54_1$ to $54_N$, so that the attenuation thereof becomes larger (for example, 40 dB or the like) (S12). For each of the variable optical attenuators which correspond to the channels being operated, the input and output powers of the signal light given to the OADM section 50 from the optical branching coupler 21 via the connecting port P2 are monitored, respectively, by the corresponding input monitor 55 and the output monitor 56, and the monitoring results are transmitted to the control section 33. In the control section 33, the attenuation of each of the variable optical attenuator which corresponds to each of the channels being operated is calculated based on the monitoring results in the input monitor 55 and the output monitor 56 (S13).

Then, the control section 33 adjusts each of the variable optical attenuators which correspond to the channels being operated, so that the calculated attenuation reaches the target attenuation which is previously set for each channel (S14). Incidentally, a target value of the attenuation can be set, for example, so that the WDM signal light output from the OADM section 50 has flat wavelength characteristics. However, the setting method of the target value of the attenuation is not limited to the above example.

When the adjustment of the variable optical attenuators $54_1$, to $54_N$ in the OADM section 50 is completed, the switching of the optical switch 22 is performed by the control section 33, and the light on the connecting port P4 side is set to be output to the post-amplifier 12 (S15). When the switching of the optical switch 22 is completed, the variable optical attenuators which correspond to the channels being operated, in the OADM section 50, are finely adjusted, so that the signal light power of each of the channels being operated, which is input to the post-amplifier 12 from the OADM section 50 via the optical switch 22, reaches a predetermined level (S16). This fine adjustment requires time as an amount for changing the attenuation is larger. However, in the present apparatus, since the adjustment of the variable optical attenuators is performed utilizing the branched lights from the optical branching coupler 21 in a stage before the switching of the optical switch 22, the fine adjustment can be completed within a previously determined in-service grace period of time. Therefore, it becomes possible to upgrade the operational state of the present optical node apparatus from the optical amplification repeating node to the OADM node without substantially suspending the communication service (S4 in FIG. 3).

As described in the above, according to the optical node apparatus of the first embodiment, since the OADM section 50 is installed according to the communications needs, the initial installation cost can be suppressed. And also, when the operational state of the optical node apparatus is upgraded to the OADM node, the adjustment of the variable optical attenuators in the OADM section 50 is performed in advance utilizing the signal lights of the operational channels branched by the optical branching coupler 21, and therefore, the OADM section 50 can be brought into an optimum state within the in-service grace period of time. Thus, it becomes possible to stably provide the continued communication service.

Next, there will be described a second embodiment of the present invention.

Figure 5:
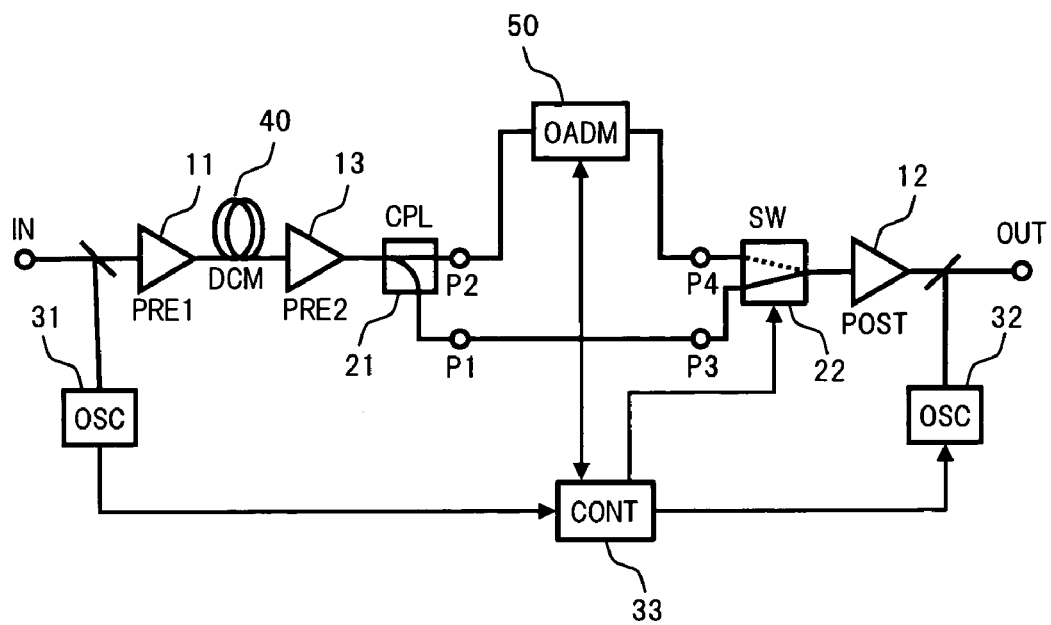
FIG. 5 is a block diagram showing a second embodiment of the optical node apparatus according to the present invention.

FIG. 5 is a block diagram showing a configuration of the second embodiment of the optical node apparatus according to the present invention.

In FIG. 5, the present optical node apparatus is an application example in which a chromatic dispersion compensator (DCM) serving as a chromatic dispersion compensating section for compensating for the chromatic dispersion generated in the WDM signal light is disposed to the configuration of the first embodiment. To be specific, a chromatic dispersion compensator 40 and a pre-amplifier (PRE2) 13 for compensating for an insertion loss of the chromatic dispersion compensator 40 are disposed, for example, between the pre-amplifier 11 and the optical branching coupler 21. Note, the configuration of the second embodiment other than the chromatic dispersion compensator 40 and the pre-amplifier 13 is similar to that of the first embodiment, and therefore, the description thereof is omitted here.

In the optical node apparatus having the configuration as described in the above, similarly to the first embodiment, in the case where the optical node apparatus is used as the optical amplification repeating node in the beginning of the system construction, the WDM signal light input to the input port IN is amplified by the pre-amplifier 11 on the first stage, and thereafter, the chromatic dispersion therein is compensated by the chromatic dispersion compensator 40. Further, the WDM signal light is amplified by the pre-amplifier 13 on the second stage so that the insertion loss of the chromatic dispersion compensator 40 is compensated. The output light from the pre-amplifier 13 is branched by the optical branching coupler 21 into two, and the branched light output to the connecting port P1 side is sent to the post-amplifier 12 via the connecting port P3 and the optical switch 22, and is amplified by the post-amplifier 12 up to the predetermined level to be output from the output port OUT.

Also in the case where the operational state of the optical node apparatus is upgraded from the optical amplification repeating node to the OADM node, similarly to the first embodiment, the OADM section 50 is connected between the connecting ports P2 and P4, and the adjustment of the variable optical attenuators $54_1$ to $54_N$ in the OADM section 50 is performed utilizing the WDM signal light which passes through the chromatic dispersion compensator 40 and the pre-amplifier 13 to be branched by the optical branching coupler 21 into two. After the adjustment is completed, the optical switch 22 is switched to the connecting port P4 side, and further, the fine adjustment of the variable optical attenuators 54$_1$, to 54$_N$ is performed within the in-service grace period of time.

Figure 6:
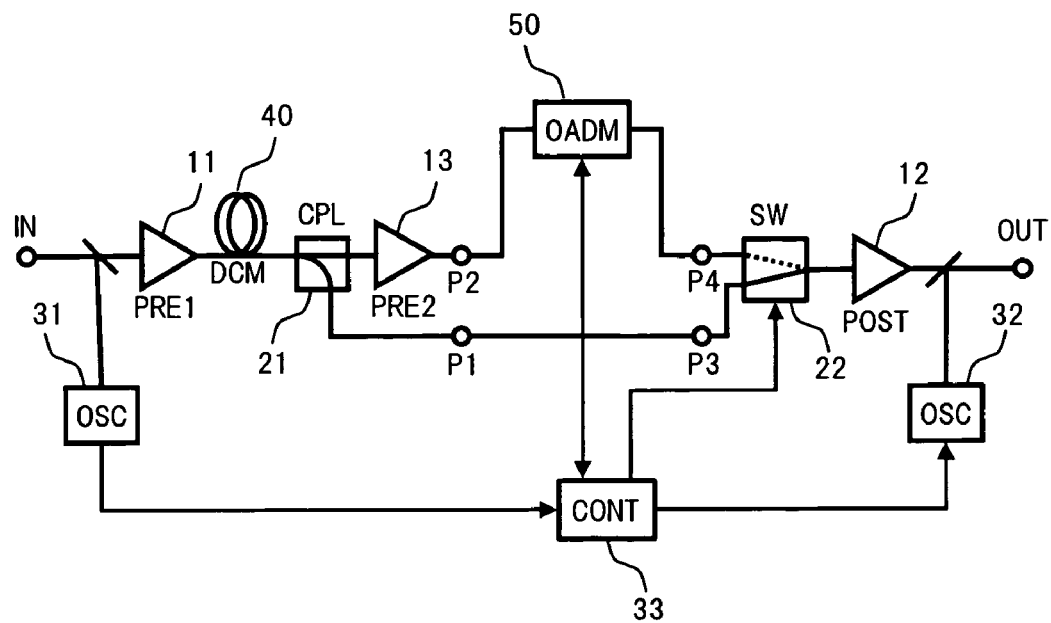
FIG. 6 is a block diagram showing a configuration example in which the arrangement of a pre-amplifier on the second stage and an optical branching coupler is modified relating to the second embodiment.

In the second embodiment, the configuration example has been shown in which the pre-amplifier 13 on the second stage is arranged between the chromatic dispersion compensator 40 and the optical branching coupler 21. However, as shown in FIG. 6 for example, the pre-amplifier 13 may be disposed between the optical branching coupler 21 and the connecting port P2. In this case, since the light output to the connecting port P2 side can be amplified by the pre-amplifier 13 up to a required level, the branching ratio by the optical branching coupler 21 can be set to be, for example, the output light power of P1 side:the output light power of P2 side=1:1. In such a configuration, when the present optical node apparatus is operated as the optical amplification repeating node, the insertion loss of the chromatic dispersion compensator 40 is compensated by the post-amplifier 12, and the number of optical amplifiers through which the WDM signal light passes is decreased to two from three in the second embodiment. Therefore, it becomes possible to achieve the characteristic improvement, such as the noise figure (NF) or the amplification efficiency, and to achieve the cost-reduction of optical amplifier due to the reduction in the number of parts.

Figure 7:
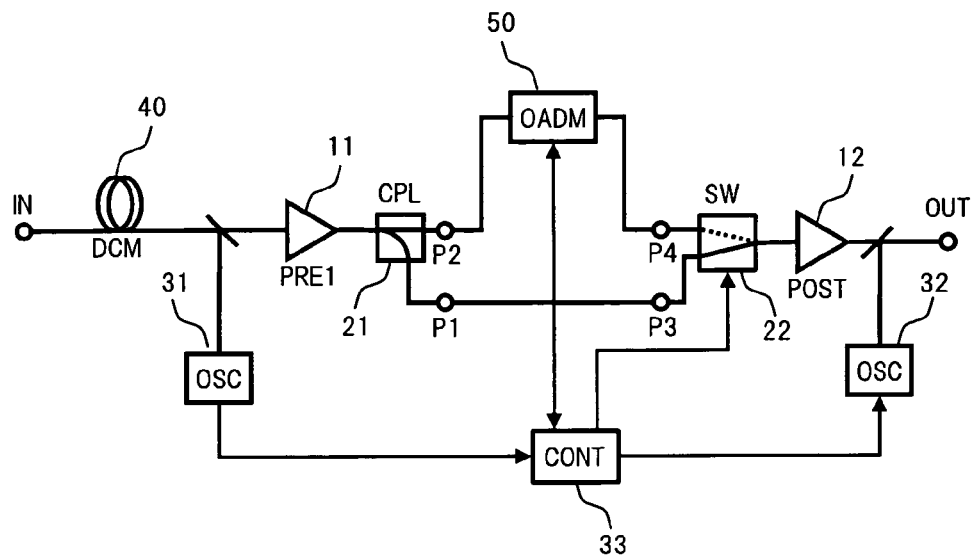
FIG. 7 is a block diagram showing a configuration example in which the arrangement of a chromatic dispersion compensator is modified relating to the second embodiment.

Further, in the second embodiment, the example has been shown in which the chromatic dispersion compensator 40 is arranged on the intermediate stage of the pre-amplifier 11 and the pre-amplifier 13. However, as shown in FIG. 7 for example, the chromatic dispersion compensation 40 can be arranged on the former stage of the pre-amplifier 11. In this case, since the insertion loss of the chromatic dispersion compensator 40 is compensated by the pre-amplifier 11, the pre-amplifier 13 on the second stage can be omitted. Such a configuration is similar to the configuration of the first embodiment except for that the chromatic dispersion compensator 40 is arranged on the first stage.

Figure 8:
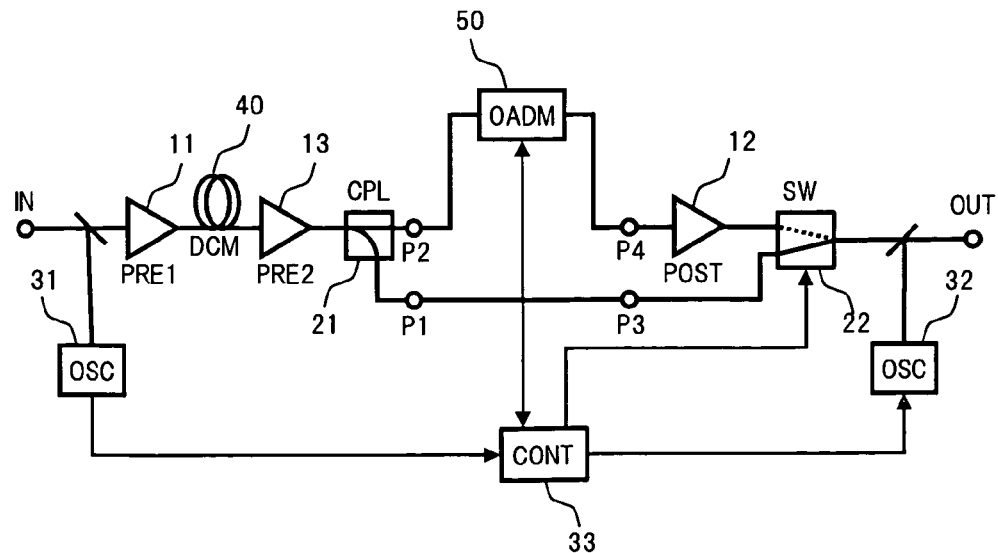
FIG. 8 is a block diagram showing a configuration example in which the arrangement of a post-amplifier and an optical switch is modified relating to the second embodiment.

Moreover, in the first and second embodiment, there has been shown the case where the optical switch 22 is arranged on the former stage of the post-amplifier 12. However, as shown in FIG. 8 for example, the optical switch 22 can be arranged on the latter stage of the post-amplifier 12. In this case, the post-amplifier 12 is disposed between the connecting port P4 and the optical switch 22. In such a configuration, when the present optical node apparatus is operated as the optical amplification repeating node, the WDM signal light is amplified only by the pre-amplifiers 11 and 13, and is not amplified by the post-amplifier 12. Therefore, although the pumping light power is increased since a loss on the output side is increased compared with the second embodiment, the noise figure (NF) can be improved.

Figure 9:
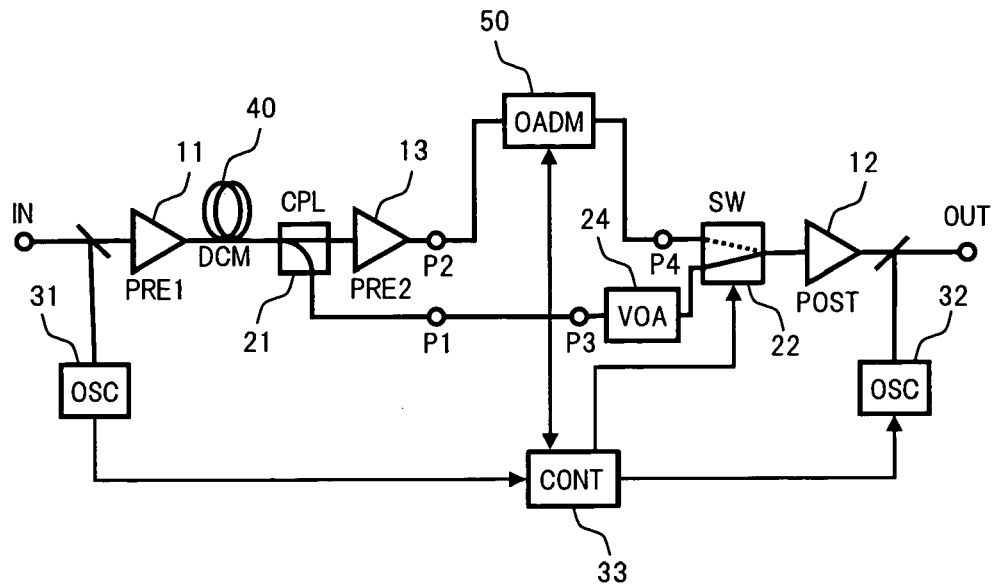
FIG. 9 is a block diagram showing a configuration example in which a variable optical attenuator is disposed on the former stage of the optical switch relating to the second embodiment.

In addition, as shown in FIG. 9 for example, a variable optical attenuator 24 may be disposed between the connecting port P3 and the optical switch 22. In this case, it becomes possible to compensate for variations in losses of the optical branching coupler 21, the optical switch 22 and optical parts such as optical connector and the like, by the variable optical attenuator 24, to thereby input the light at the predetermined input level to the post-amplifier 12.

Next, there will be described a third embodiment of the present invention.

Figure 10:
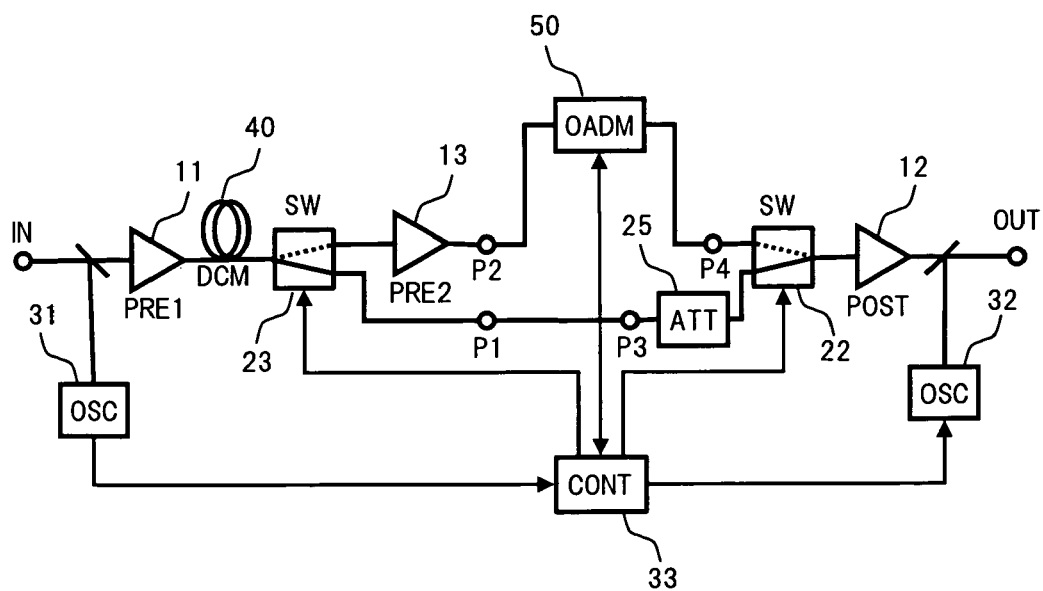
FIG. 10 is a block diagram showing a third embodiment of the optical node apparatus according to the present invention.

FIG. 10 is a block diagram showing a configuration of the third embodiment of the optical node apparatus according to the present invention.

In FIG. 10, the present optical node apparatus is an application example in which an optical switch (SW) 23 is used in place of the optical branching coupler 21 which has been used in the first and second embodiment. In the case where the optical switch 23 is used in place of the optical branching coupler 21, it is no longer possible to utilize the WDM signal light branched by the optical branching coupler 21, for the adjustment of the OADM section 50 executed when the operational state of the optical node apparatus is upgraded from the optical amplification repeating node to the OADM node. Therefore, in the present embodiment, the OADM section 50 is adjusted by utilizing an amplified spontaneous emission (ASE) light generated in the optical amplifier.

To be specific, similarly to the second embodiment described above, considering the configuration in which the chromatic dispersion compensator 40 is provided within the optical node apparatus, for example the chromatic dispersion compensator (DCM) 40 is arranged on the latter stage of the pre-amplifier (PRE1) 11, and the optical switch 23 is disposed for switching the output determination of the WDM signal light passed through the chromatic dispersion compensator 40 to either the connecting port P1 or the connecting port P2. Further, the pre-amplifier (PRE2) 13 is arranged between the optical switch 23 and the connecting port P2, and an optical attenuator (ATT) 25 is inserted between the connecting port P3 and the optical switch 22 on the output side. The switching of the optical switch 23 is controlled by the control section 33 according to the operational state of the present optical node apparatus. When a pumping light is supplied to an optical amplification medium, the pre-amplifier 13 generates the ASE light regardless of whether or not the signal light is input. A wavelength bandwidth of the ASE light contains the wavelength bandwidth of the WDM signal light given to the present optical node apparatus. Since the power of the WDM signal light input to the post-amplifier 12 is increased when the present optical node apparatus is operated as the optical amplification repeating node, by using the optical switch 23 in place of the optical branching coupler 21, the optical attenuator 25 is disposed for adjusting the increased power. Note, the example has been shown in which the optical attenuator having the fixed attenuation is used. However, it is also possible to use an optical attenuator (VOA) having the variable attenuation. By adopting the variable optical attenuator, a variation in insertion loss of the optical part can be compensated to adjust the input light to the post-amplifier 12 at the predetermined level.

Figure 11:
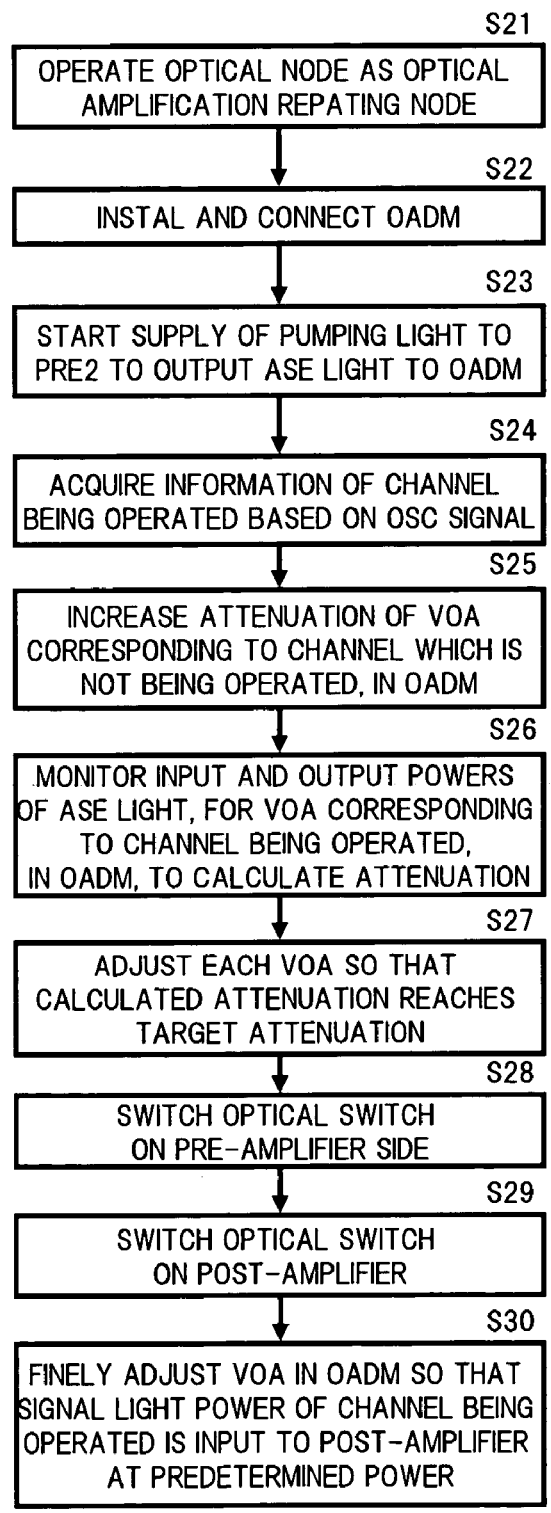
FIG. 11 is a flowchart for explaining an operation for when the operational state of the optical node apparatus is upgraded to the OADM mode in the third embodiment.

Here, there will be described in detail an operation for when the operational state of the optical node apparatus of the configuration as described above is upgraded from the optical amplification repeating node to the OADM node, referring to a flowchart of FIG. 11.

Firstly, in the optical node apparatus in the beginning of the system construction, in the configuration where the OADM section 50 is not attached between the connecting ports P2 and P4, the initial setting is performed such that the optical switch 23 is controlled by the control section 33 so that the WDM signal light passed through the chromatic dispersion compensator 40 is output to the connecting port P1 side, and at the same time, the optical switch 22 is also controlled by the control section 33 so that the light on the connecting port P3 side is output to the post-amplifier 12. As a result, the WDM signal light input to the input port IN is amplified by the pre-amplifier 11, and thereafter, passes through the chromatic dispersion compensator 40 to be sent to the connecting port P1 side by the optical switch 23. Then, the WDM signal light passed through the connecting port P1 is input to the optical attenuator 25 via the connecting port P3 to be attenuated to a required level, and thereafter, is sent via the optical switch 22 to the post-amplifier 12 to be again amplified, and then, the amplified WDM signal light is output from the output port OUT Thus, the present optical node apparatus is operated as the optical amplification repeating node (S21 in FIG. 11). Note, in this state, the operation of the pre-amplifier 13 on the second stage is stopped.

Next, when the communications needs occur in the area where the present optical node apparatus is arranged, and the present optical node apparatus is decided to be operated as the OADM node, similarly to the first embodiment, the OADM section 50 is newly disposed to be connected to the connecting ports P2 and P4 (S22). When the connection of the OADM section 50 is completed, the supply of the pumping light in the pre-amplifier 13 on the second stage is started, and the ASE light generated in the pre-amplifier 13 is sent to the OADM section 50 via the connecting port P2 (S23). In this state, since the WDM signal light passed through the chromatic dispersion compensator 40 is sent to the connecting port P1 side by the optical switch 23, the WDM signal light is not input to the pre-amplifier 13. Further, the control section 33 acquires the channel information (the number of wavelengths and the wavelength allocation) of the WDM signal light during the operation of the present optical node apparatus as the optical amplification repeating node, based on the output signal from the OSC receiving section 31 (S24).

When the connection of the OADM section 50, the supply of the pumping light to the pre-amplifier 13 and the acquisition of the channel information are completed, the control section 33 adjusts the variable optical attenuator corresponding to the channel which is not being operated, among the variable optical attenuators $54_1$ to $54_N$ in the OADM section 50, so that the attenuation thereof becomes larger (for example, 40 dB or the like) (S25). For each of the variable optical attenuators which correspond to the channels being operated, the input and output powers of the ASE light given to the OADM section 50 from the pre-amplifier 13 via the connecting port P2 are monitored, respectively, by the corresponding input monitor 55 and the output monitor 56, and the monitoring results are transmitted to the control section 33. In the control section 33, the attenuation of the variable optical attenuator which corresponds to each of the channels being operated is calculated based on the monitoring results in the input monitor 55 and the output monitor 56 (S26).

Incidentally, although the level of the ASE light input or output to or from the variable optical attenuator is lower than the level of the signal light which is input or output to or from the variable optical attenuator during the normal operation, it is possible to generate in the pre-amplifier 13 the ASE light of a level exceeding the minimum light receiving sensitivity of a light receiving element used in each of the input monitor 55 and the output monitor 56, and further, it is sufficiently possible to calculate the attenuation of the variable optical attenuator by making the difference between the input and output monitors.

Then, the control section 33 adjusts each of the variable optical attenuators which correspond to the channels being operated, so that the calculated attenuation reaches the target attenuation which is previously set for each channel (S27). At this stage, the adjustment of the variable optical attenuators is performed in advance based on the monitoring results of only the ASE light which does not contain the signal light component.

When the adjustment of the variable optical attenuators $54_1$ to $54_N$ in the OADM section 50 is completed, the switching of the optical switch 23 is performed by the control section 33, to be set so that the WDM signal light passed through the chromatic dispersion compensator 40 is output to the connecting port P2 side (S28). Next, the switching of the optical switch 22 is also performed by the control section 33, to be set so that the light on the connecting port P4 side is output to the post-amplifier 12 (S29).

When the switching of the optical switch 22 and the optical switch 23 is completed, the variable optical attenuators which correspond to the channels being operated, in the OADM section 50, are finely adjusted, so that the signal light power of each of the channels being operated, which is output from the OADM section 50 to be input to the post-amplifier 12 via the optical switch 22, reaches a predetermined level (S30). This fine adjustment requires time as an amount for changing the attenuation is larger. However, in the present apparatus, since the adjustment of the variable optical attenuators is performed utilizing the ASE light from the pre-amplifier 13 in a stage before the switching of the optical switch 22, the fine adjustment can be completed within the previously determined in-service grace period of time. Therefore, it becomes possible to upgrade the operational state of the present optical node apparatus from the optical amplification repeating node to the OADM node without substantially suspending the communication service. Further, since an error caused by the level adjustment using the ASE light in the advance adjustment is compensated by this fine adjustment, the variable optical attenuators can be optimized with the excellent accuracy even when the advance adjustment is performed utilizing the ASE light (strictly speaking, since a gain wavelength characteristic of the signal light is not identical to a gain wavelength characteristic of the ASE light, it becomes important that the minute level adjustment is performed by monitoring the signal light).

As described in the above, according to the optical node apparatus of the third embodiment, even in the configuration where the optical switch 23 is used in place of the optical branching coupler 21, and the variable optical attenuators in the OADM section 50 are adjusted in advance utilizing the ASE light generated in the post-amplifier 13, when the operational state of the optical node apparatus is upgraded to the OADM node, similarly to the second embodiment, it becomes possible to suppress the initial installation cost and also to stably provide the continued communication service.

Figure 12:
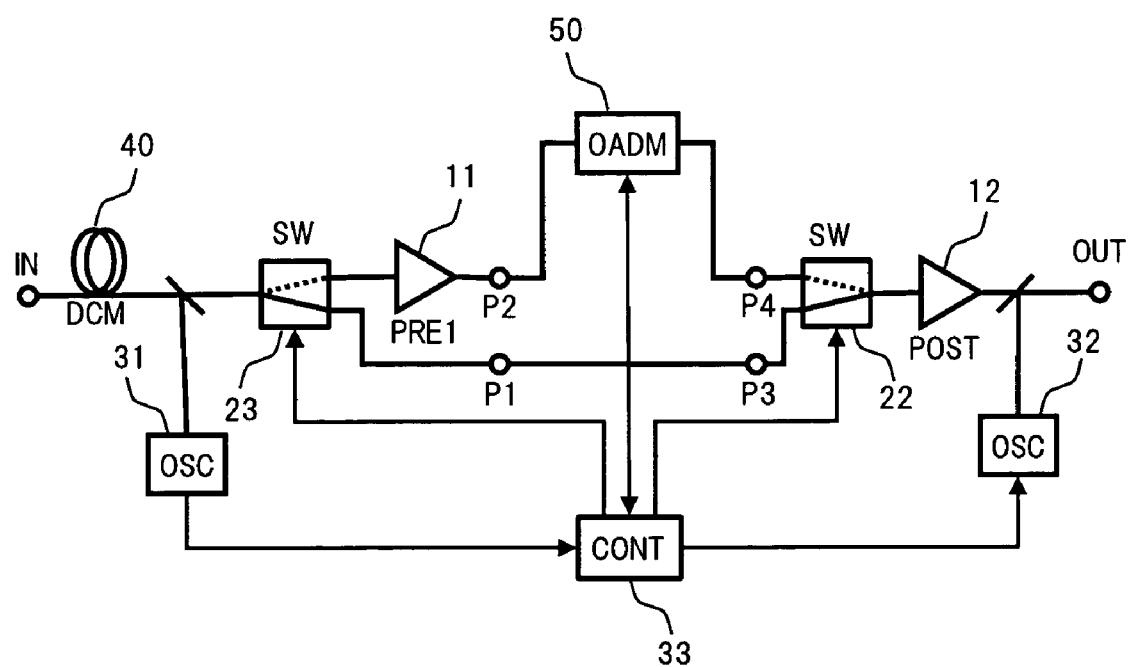
FIG. 12 is a block diagram showing a configuration example in which the arrangement of a chromatic dispersion compensator is modified relating to the third embodiment.

Incidentally, in the third embodiment described above, the example has been shown in which the chromatic dispersion compensator 40 is arranged on the intermediate stage between the pre-amplifier 11 and the post-amplifier 12. However, as shown in FIG. 12 for example, the chromatic dispersion compensator 40 can be arranged on the former stage of the pre-amplifier 11. In this case, the optical switch 23 can be disposed between the chromatic dispersion compensator 40 and the pre-amplifier 11, and the pre-amplifier 11 is arranged on the connecting port P2 side. In such a configuration, when the present optical node apparatus is operated as the optical amplification repeating node, since the WDM signal light is sent to the post-amplifier 12 without being amplified by the pre-amplifier 11, it is possible to omit the optical attenuator 25 disposed for the level adjustment of the WDM signal light input to the post-amplifier 12 in the third embodiment.

Further, in the second and third embodiments, the description has been made on the configuration in which the chromatic dispersion compensator is disposed within the optical node apparatus. However, the present invention is not limited to the above, and is also applicable to the case where, in place of the chromatic dispersion compensator, various types of optical devices, such as a gain equalizer and the like, are disposed within the optical node apparatus.

Moreover, in the respective embodiments described above, it is also possible to adopt a configuration in which a branching coupler is provided on the output side of the pre-amplifier 11 to increase the number of output ports from the pre-amplifier 11, so that a part of the output light from the pre-amplifier 11 is transmitted to another system.

What is claimed is:

1. A method of upgrading an operational state of an optical node apparatus arranged on an optical transmission path of an optical communication system for transmitting a wavelength division multiplexed signal light, from an optical amplification repeating node to an optical add/drop multiplexing node, comprising:

amplifying the wavelength division multiplexed signal light input to said optical node apparatus from said optical transmission path by a first optical amplifying section, branching said amplified wavelength division multiplexed signal light by an optical branching coupler into two to send one of the branched lights to a first optical path while sending the other branched light to a second optical path, selecting the light propagated through said first optical path by a first optical switch to amplify the selected light by a second optical amplifying section, and outputting said wavelength division multiplexed signal light amplified by said second optical amplifying section to said optical transmission path, to thereby operate said optical node apparatus as the optical amplification repeating node; and when the operational state of said optical node apparatus is switched from the optical amplification repeating node to the optical add/drop multiplexing node, connecting an optical add/drop multiplexing section having a function of dropping or adding a signal light of particular channel from or to the wavelength division multiplexed signal light and also including an output power adjusting section capable of adjusting the output power of signal light of each channel, between a set of connecting ports disposed on said second optical path, calculating an adjusting amount in said output power adjusting section of said connected optical add/drop multiplexing section utilizing the wavelength division multiplexed signal light which is branched by said optical branching coupler to be input via said second optical path, and controlling said output power adjusting section so that said calculated adjusting amount reaches a previously determined target adjusting amount, and after said control is completed, controlling said first optical switch so that the light propagated through said second optical path is selected.

2. A method of upgrading an optical node according to claim 1, wherein, when a second optical switch which outputs the wavelength division multiplexed signal light amplified by said first optical amplifying section to either said first optical path or said second optical path, is disposed in place of said optical branching coupler in said optical node apparatus, and also, a third optical amplifying section is disposed on said second optical path between said second optical switch and said connecting ports;

when the operational state of said optical node apparatus is made to be the optical amplification repeating node, controlling said second optical switch so that the wavelength division multiplexed signal light amplified by said first optical amplifying section is output to said first optical path; and when the operational state of said optical node apparatus is switched from the optical amplification repeating node to the optical add/drop multiplexing node, calculating the adjusting amount in said output power adjusting section of said optical add/drop multiplexing section connected between said connecting ports, utilizing an amplified spontaneous emission light generated in said third optical amplifying section, controlling said output power adjusting section so that said calculated adjusting amount reaches a previously determined target adjusting amount, and after said control is completed, controlling said second optical switch so that the wavelength division multiplexed signal light amplified by said first optical amplifying section is output to said second optical path and also controlling said first optical switch so that the light propagated through said second optical path is selected.

3. A method of upgrading an optical node according to claim 2, wherein the chromatic dispersion compensation is performed on the wavelength division multiplexed signal light input to said optical node apparatus.

4. An optical node apparatus arranged on an optical transmission path of an optical communication system for transmitting a wavelength division multiplexed signal light, comprising:

an input port and an output port connected to said optical transmission path;

a first optical amplifying section that amplifies the wavelength division multiplexed signal light input to said input port;

an optical branching coupler which branches the wavelength division multiplexed signal light amplified by said first optical amplifying section into two, to send one of the branched lights to a first optical path while sending the other branched light to a second optical path;

a set of connecting ports disposed on said second optical path;

an optical add/drop multiplexing section which is disposed between said connecting ports according to communications needs, having a function of dropping or adding a signal light of particular channel from or to the wavelength division multiplexed signal light and also including an output power adjusting section capable of adjusting the output power of signal light of each channel;

a first optical switch which selects either the light propagated through said first optical path or the light propagated through said second optical path to output the selected light;

a second optical amplifying section that amplifies the wavelength division multiplexed signal light output from said first optical switch to send the amplified wavelength division multiplexed signal light to the optical transmission path via said output port; and a control section that controls said first optical switch so that the light propagated through said first optical path is selected, when an operational state of said optical node apparatus is made to be an optical amplification repeating node, and when the operational state of said optical node apparatus is switched from the optical amplification repeating node to an optical add/drop multiplexing node, calculating an adjusting amount in said output power adjusting section of said optical add/drop multiplexing section connected between said connecting ports, utilizing the wavelength division multiplexed signal light which is branched by said optical branching coupler to be input via said second optical path, controlling said output power adjusting section so that said calculated adjusting amount reaches a previously determined target adjusting amount, and thereafter, controlling said first optical switch so that the light propagated through said second optical path is selected.

5. An optical node apparatus according to claim 4,
wherein a chromatic dispersion compensating section that performs the chromatic dispersion compensation of the wavelength division multiplexed signal light is provided between said input port and said optical branching coupler.

6. An optical node apparatus according to claim 5,
wherein said chromatic dispersion compensating section is arranged between said first optical amplifying section and said optical branching coupler; and
a third optical amplifying section is provided between said chromatic dispersion compensating section and said optical branching coupler.

7. An optical node apparatus according to claim 5,
wherein said chromatic dispersion compensating section is arranged between said first optical amplifying section and said optical branching coupler; and
a third optical amplifying section is provided on said second optical path between said optical branching coupler and said connecting ports.

8. An optical node apparatus according to claim 5,
wherein said chromatic dispersion compensating section is arranged between said input port and said first optical amplifying section.

9. An optical node apparatus according to claim 4,
wherein said first optical switch is arranged between said second optical amplifying section and said output port; and
said second optical amplifying section amplifies the light propagated through said second optical path to output the amplified light to said first optical switch.

10. An optical node apparatus according to claim 4,
wherein a second optical switch which outputs the wavelength division multiplexed signal light amplified by said first optical amplifying section to either said first optical path or said second optical path, is disposed in place of said optical branching coupler, and also a third optical amplifying section is disposed on said second optical path between said second optical switch and said connecting ports;
said control section controls said second optical switch so that the wavelength division multiplexed signal light amplified by said first optical amplifying section is output to said first optical path, and also controls said first optical switch so that the light propagated through said first optical path is selected, when the operational state of said optical node apparatus is made to be the optical amplification repeating node; and when the operational state of said optical node apparatus is switched from the optical amplification repeating node to the optical add/drop multiplexing node, calculates the adjusting amount in said output power adjusting section of said optical add/drop multiplexing section connected between said connecting ports, utilizing an amplified spontaneous emission light generated in said third optical amplifying section, controls said output power adjusting section so that said calculated adjusting amount reaches the previously determined target adjusting amount, and thereafter, controls said second optical switch so that the wavelength division multiplexed signal light amplified by said first optical amplifying section is output to said second optical path and also controls said first optical switch so that the light propagated through said second optical path is selected.

11. An optical node apparatus according to claim 10,
wherein a chromatic dispersion compensating section that performs the chromatic dispersion compensation of the wavelength division multiplexed signal light is provided between said input port and said second optical switch.

* * * * *